Figure 1:
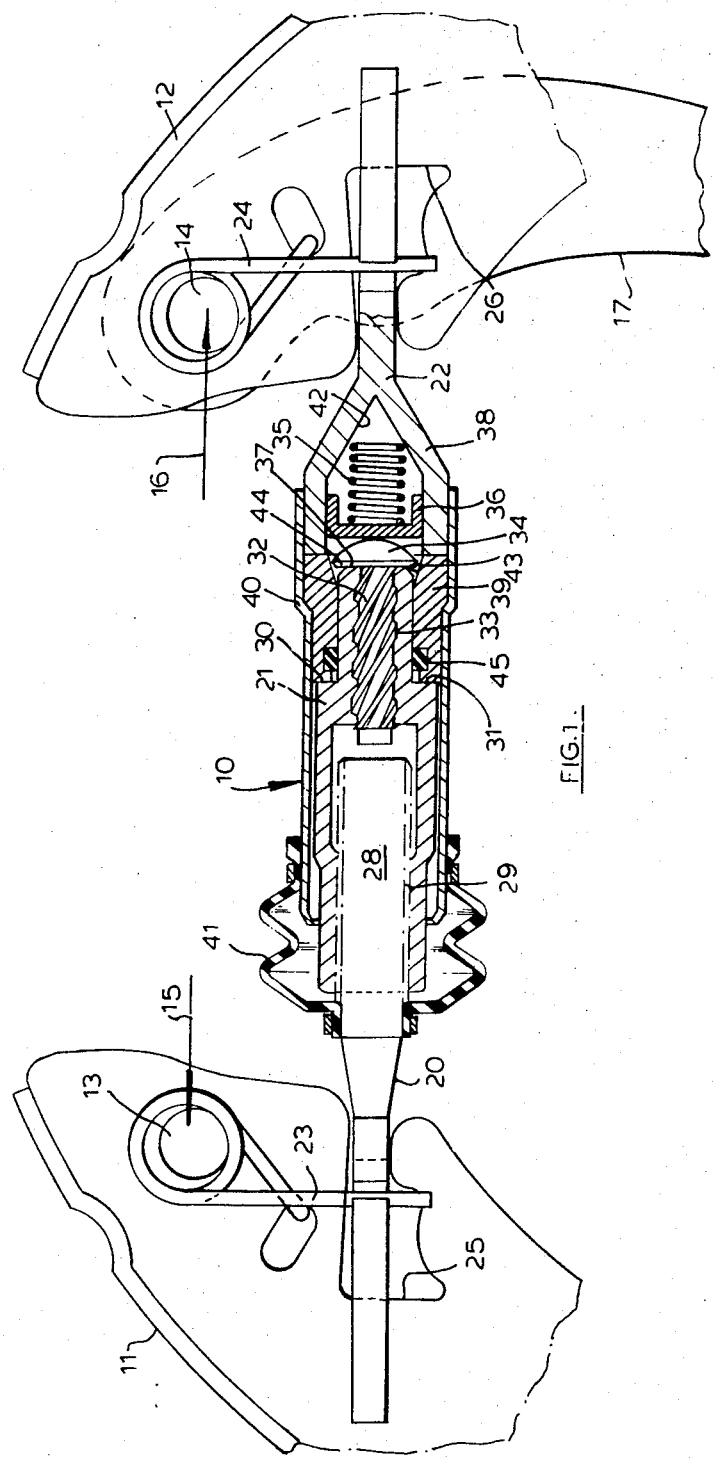

United States Patent

Farr

[15] 3,680,664
[45] Aug. 1, 1972

[54] BRAKE ADJUSTERS
[72] Inventor: Glyn Phillip Reginald Farr, Kenilworth, England
[73] Assignee: Girling Limited, Birmingham, Warwickshire, England
[22] Filed: Aug. 17, 1970
[21] Appl. No.: 64,518

[30] Foreign Application Priority Data
Aug. 21, 1969 Great Britain..............41,756/69

[52] U.S. Cl..........................188/79.5 GT, 188/196 D
[51] Int. Cl.............................................F16d 65/56
[58] Field of Search......188/71.9, 79.5 GE, 79.5 GT, 188/196 D

[56] References Cited
UNITED STATES PATENTS
3,194,358  7/1965  Brandt......................188/196 D
3,550,732  12/1970  Beller........................188/196 D Primary Examiner—Duane A. Reger
Attorney—Scrivener, Parker, Scrivener and Clarke

[57] ABSTRACT

A slack adjuster for vehicle brakes has first, second, third and fourth members with a common thrust axis. The first and third members are non-rotatable and the second member has a non-reversible screw-thread connection with the first member and an abutment surface mating with a like surface on the third member. The fourth member has a reversible screw-thread connection with the second or the third member and a friction surface cooperating with a like friction surface on the third or second member respectively. A spring acting on the fourth member biasses the fourth member to a resting position. A stop on the second or third member can replace this spring. When adjustment is required, this spring biasses the friction faces together and the reversible screw-thread connection causes the second member to be turned to take up the excess slack.

16 Claims, 6 Drawing Figures

BRAKE ADJUSTERS

The present invention relates to brake slack adjusters and more particularly to slack adjusters of the kind described in U.S. Pat. No. 3,442,357 wherein an interengagement through a helically inclined surface is used to convert excessive axial displacement between two members into a rotary motion for screwing a screw-thread connection to effect automatic adjustment.

According to one aspect of the present invention, a slack adjuster for a brake system comprises a first non-rotatable member, a second rotatable member and a third non-rotatable member having a common thrust axis, a non-reversible screw thread connection between said first and second members, said second member being axially displaceable and rotatable relative to said third member and said second and third members having mating abutment surfaces for the transmission of thrust between said first and third members via said abutment surfaces, said second member and said non-reversible screw-thread connection, a fourth member coaxial with said thrust axis, a reversible screw-thread connection between said fourth member and one of said second and third members, cooperating friction surfaces between said fourth member and the other of said second and third members, said fourth member being freely rotatable relatively to said other member when said friction surfaces are parted, said fourth member having a resting position relative to said one member when said abutment surfaces are in interengagement, and spring means biassing said fourth member into said resting position.

A reversible screw-thread connection between two members is a connection such that axial displacement of one member causes rotation of the other member and vice versa whereas a non-reversible screw-thread connection between two members is one in which an axial force applied to one member cannot normally cause relative rotation between the members. Whether a screw-thread connection is reversible or not depends upon the pitch and flank angles of the thread and the coefficient of friction between the members.

Thus upon the presence of excessive brake slack, said spring means biasses said friction faces into interengagement to prevent said fourth member from rotating and the axial travel between said first and third members upon actuation of the brake system causes said reversible screw-thread connection to turn said second member to screw said non-reversible screw-thread connection in a direction to reduce the brake slack.

The spring means preferably acts between said other member and said fourth member.

The invention is advantageously applicable to drum brakes in which the slack adjuster acts as a strut between opposed brake shoes to limit retraction of the brake shoes. A handbrake can conveniently act between one brake shoe and one end of such strut. A hydraulic actuator can be arranged to act on the brake shoes in the region of the adjuster.

According to another aspect of the present invention, a slack adjuster for a brake system comprises a first non-rotatable member, a second rotatable member and a third non-rotatable member having a common thrust axis, a non-reversible screw-thread connection between said first and second members, said second member being axially displaceable and rotatable relative to said third member and said second and third members having mating abutment surfaces for the transmission of thrust between said first and third members via said abutment surfaces, said second member and said non-reversible screw-thread connection, a fourth member coaxial with said thrust axis, a reversible screw-thread connection between said fourth member and said third member, cooperating friction surfaces between said fourth member and said second member, said fourth member being freely rotatable relatively to said second member when said friction surfaces are parted, said fourth member having a resting position when said abutment surfaces are in interengagement.

A spring may act between said second and fourth members to resist axial movement of said fourth member away from said resting position or a stop can be provided on said second member to define said resting position. In the latter case a biassing spring preferably acts on said third member in a direction to urge its abutment surface against that of the second member and a clearance at the non-reversible screw-thread connection provides the desired brake slack.

The first member can itself constitute a piston of a hydraulic actuator, e.g. for a spot-type disc brake.

Figure 2:
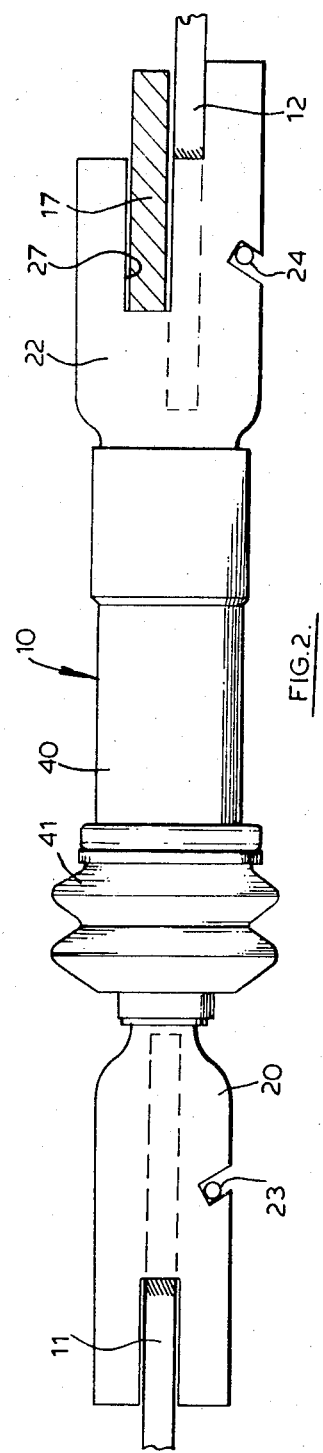
Figure 3:
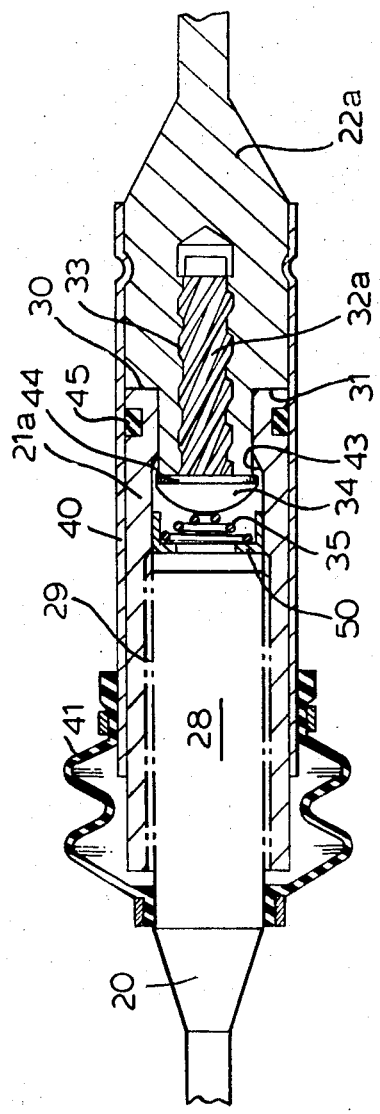
Figure 4:
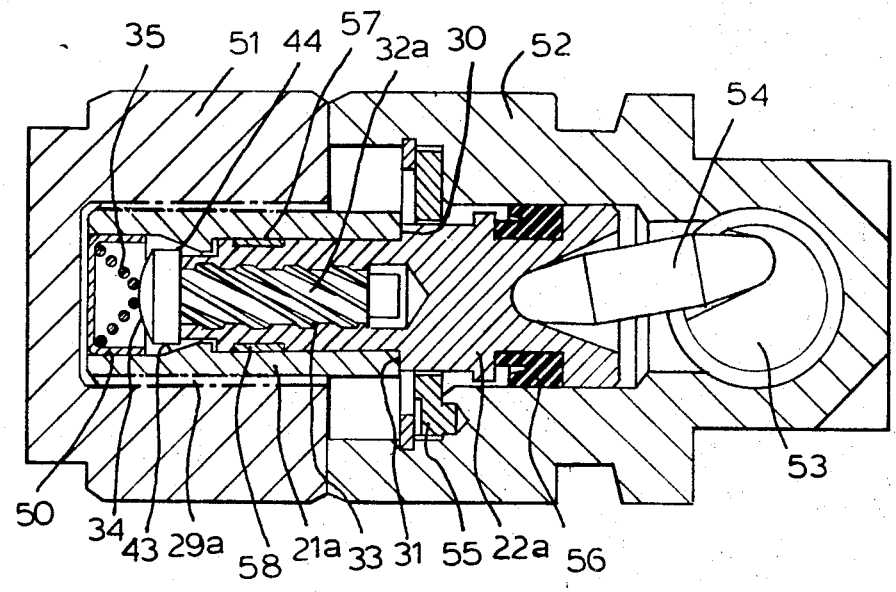
Figure 5:
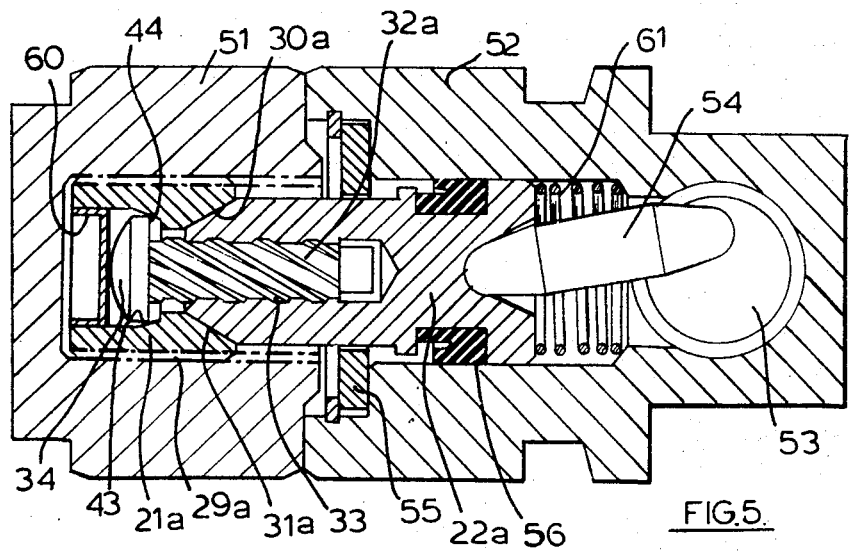
Figure 6:
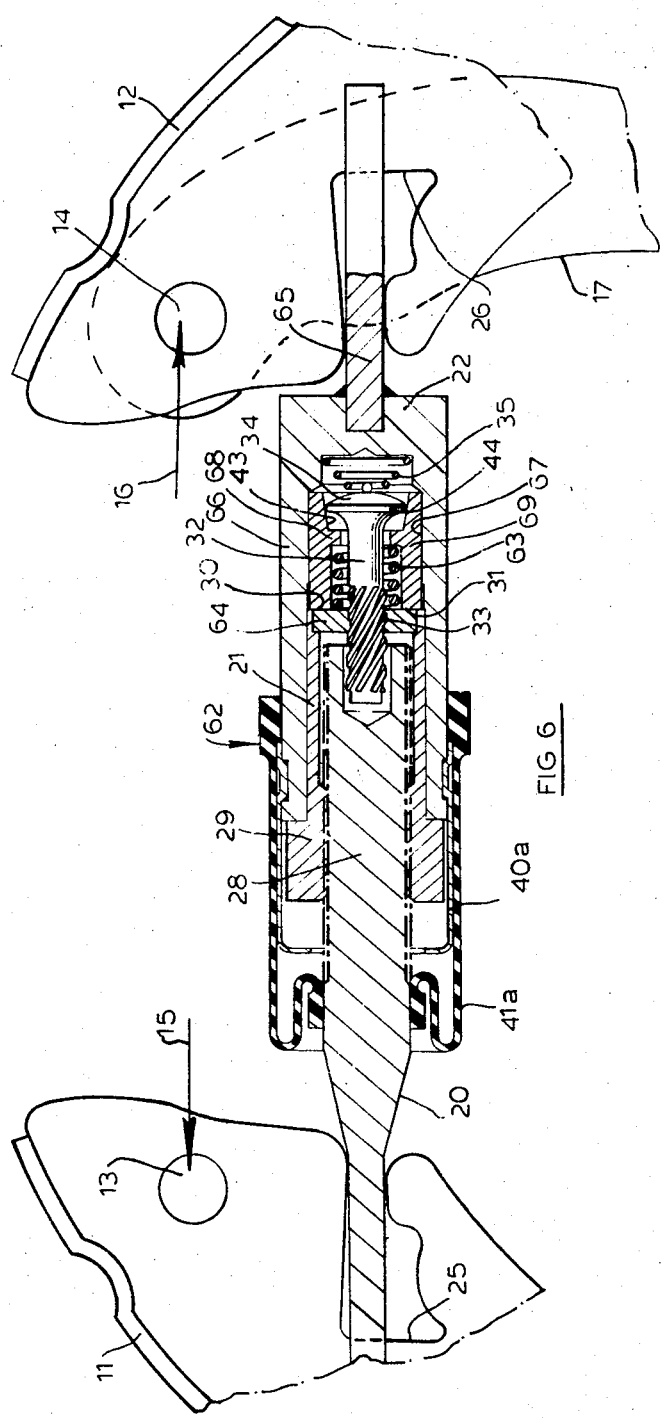

The invention is further described, by way of example, with reference to the accompanying drawings, in which:

FIG. 1 is a sectional view of one embodiment of drum brake slack adjuster in accordance with the invention, FIG. 2 is a plan view of the adjuster of FIG. 1, FIG. 3 is a sectional view of a second embodiment of drum brake slack adjuster in accordance with the invention, FIGS. 4 and 5 are sectional views of modifications of the adjuster of FIG. 3 to suit a spot-type disc brake, and FIG. 6 is a sectional view, similar to FIG. 1, of a third embodiment of drum brake slack adjuster.

Referring to FIGS. 1 and 2, a slack adjuster 10 acts as a strut between upper ends of opposed brake shoes 11 and 12 whose lower ends (not shown) react against abutments. A hydraulic actuator (also not shown) acts in the directions of arrows 15 and 16 on pins 13 and 14 at the upper ends of the brake shoes and serves for the normal application of the brake shoes. An auxiliary actuator (hand brake) comprises a lever 17 operative between the shoe 12 and the right hand end of the adjuster 10.

The adjuster 10 comprises a first non-rotatable end member 20, a second intermediate rotatable member 21 and a third non-rotatable end member 22. Springs 23 and 24 conveniently coiled about the pins 13 and 14 hold the end member 20 and 22 in notches 25 and 26 in the webs of the shoes 11 and 12. The handbrake lever 17 is journalled about the pin 14 and engages in a slot 27 in the member 22.

The end member 20 includes a spindle 28 and the intermediate member 21 comprises a sleeve having a non-reversible screw-thread connection 29 with the spindle 28. At its end opposite the spindle 28 the sleeve member 21 has an external annular face forming an abutment surface 30 for a corresponding abutment surface 31 on the end member 22. A fourth screw member 32 has a reversible screw-thread connection 33 with the sleeve member 21, the screw-thread connections 29 and 33 being of opposite hand. The screw member 32 has a domed head 34. A light spring 35 which acts between the member 22 and a cup-like element 36 bearing against the domed face of the head 34 biasses this head against the end 37 of the sleeve member 21. A conical friction surface 43 inside the end member 22 cooperates with a friction surface 44 about the rim of the head 34. The relative dimensions of the member 21, 22 and 32 are such that the friction surfaces 43 and 44 are separated by a gap when the abutment surfaces 30 and 31 are in engagement with one another.

The end member 22 is for convenience in two parts 38 and 39 joined together by a shroud 40 which extends over the sleeve member 21. A rubber boot 41 arranged between the end member 20 and this shroud 40 protects the screw-thread connection 29 from dirt. The part 38 engages in the notch 26 and has a cavity 42 which contains the spring 35. The part 39 journals the end of the member 21 and has the abutment surface 31 and the friction surface 43 thereon. A friction element 45 arranged between the sleeve member 21 and the part 39 prevents the sleeve member 21 from turning the wrong way unintentionally, e.g. under vibration. A one way clutch could alternatively be provided for this purpose e.g. a roller type clutch or a spring clutch, i.e. a spring wire coiled about the member 21.

The adjuster 1 acts as a strut between the brake shoes 11 and 12 to limit movement of the shoes towards one another when the hydraulic actuator is not applied. When the hydraulic actuator is applied the upper ends of the brake shoes are urged apart to apply the brakes. The springs 23 and 24 hold the end members 20 and 22 against their respective shoes whereby these end members are moved apart slightly. Because of the screw-thread connection 29 the sleeve member 21 moves with the end member 21 whereby the abutment surfaces 30 and 31 are separated. Normally the brake slack is such that the friction surfaces 43 and 44 do not come into engagement with one another during brake application and no adjustment can take place. However as soon as the brake slack becomes excessive, e.g. due to lining wear, the conical friction surface 43 on the non-rotatable member 22 engages the friction surface 44 on the screw member 32. This prevents the screw member 32 from moving further to the left with the sleeve member 21 and also prevents the screw member 32 from rotating due to the high frictional forces which can be developed at the conical friction surface 39. Upon further movement of the sleeve member 32 to the left the reversible screw-thread connection 33 causes the sleeve member 21 to turn slightly and so adjust the screw-thread connection 29 in a direction to reduce the slack.

When the hydraulic actuator is released so that the upper ends of the brake shoes can move towards one another, the frictional surfaces 43 and 44 are separated and the spring 35 acting through the cup-like element 36 urges the screw member 32 back into its resting position with its head 34 in abutment with the end 37 of the sleeve member 21. Due to the comparatively low-frictional torque developed between the domed head 34 and the cap 36 and the comparatively high frictional torque at the friction element 45 the sleeve member 21 is not turned back by the reversible screw-thread connection 33: rather the screw member 32 turns relative to the end members 20 and 22.

It is to be noted that the spring 35 urges the screw member 32 into its end position before the abutment surfaces 30 and 31 come into engagement. Thus the adjuster does not rely on the brakes being fully retracted before the adjuster can operate to take up excess slack.

When the handbrake is applied, the lever 17 is turned clockwise to apply thrust to the shoe 11 through the adjuster 10, the thrust being transmitted via the abutment surfaces 30 and 31 and via the non-reversible screw-thread connection 29. The reversible screw-thread connection 33 is not loaded and does not therefore need to have great strength.

Instead of the end member 22 abutting the web of the brake shoe 12, a stop could be provided on this shoe for the handbrake lever 17.

The embodiment of FIG. 3 is in may respects similar to the embodiment of FIGS. 1 and 2 and like parts or parts having equivalent functions are denoted by the like reference numerals. The embodiment of FIG. 3 is different in that the reversible screw-thread connection 33 is provided between the screw member 32a and the end member 22a and the conical friction surface 43 is on the sleeve member 21a. The spring 35 act between an element 50 force-fitted in the sleeve member 21a and the domed head 34. The end of the spring 35 engaging the domed head is of small diameter whereby only a comparatively small frictional torque is applied to the screw member 32a by the spring 35. The friction element 45 acts between the sleeve 21a and the shroud 4 on the end member 22a.

The operation of the adjuster of FIG. 3 is the same as that of the adjuster of FIGS. 1 and 2.

FIG. 4 shows the adjuster of FIG. 3 modified to suit a spot-type disc brake whose actuator is of the kind having opposed hydraulic pistons 51 and 52 slidable in a through bore in a body member (not shown). Disc brakes of this kind are described in British Patent specification No. 1,075,371. Again like or equivalent parts are denoted by like reference numerals, the piston 51 itself being equivalent to the end member 20. The sleeve member 21a has an external non-reversible screw-thread connection 29a with the piston 51. A cam 53 serving as an auxiliary actuator is journalled in the piston 52 and acts through a dolly 54 on the end member 22a of the adjuster. A restraining element 55 fitted to the piston 52 prevents the end member 22a from rotating. A seal 56 seals the member 22a to the piston 52. The hydraulic pressure applied to the space between the pistons 51 and 52 to actuate the brake acts on the member 22a to hold it against the cam 53.

The piston 51 acts on a directly operated pad and the piston 52 acts on a yoke slidably supported on the body member and straddling the disc as described in British Patent specification No. 1,075,371. The yoke in turn acts on an indirectly operated pad located at the opposite side of the disc from the directly operated pad.

A friction element 57 between the sleeve member 21a and the end member 22a comprises a spring which is of generally square configuration with rounded corners in its free state and is split at one corner to enable it to be fitted in a groove 58 in the end member 22a.

When this spring is constrained to fit in the annular groove 58 it frictionally engages the sleeve member 21a.

The adjuster of FIG. 4 operates in exactly the same way as the adjuster of FIG. 3.

In FIG. 5, parts like or equivalent to those of FIG. 4 are denoted by like reference numerals. The adjuster of FIG. 5 differs from that of FIG. 4 mainly by the omission of the spring 35 and instead thereof the provision of a stop comprising a cup-like element 60 which is press-fitted in the sleeve member 21a so as to cooperate with the domed head 34 of the screw member 32a. The element 60 is pressed into place by a tool which engages only the central portion of the base of the cup-like element 60 so that when the tool is removed this base springs away slightly from the domed head 34 to provide a slight axial clearance of e.g. one thousandth of an inch for the screw member 32a. This slight clearance enables the friction surfaces 43 and 44 to be separated but is otherwise negligible. The non-reversible screw-thread connection 29a is made to have sufficient axial clearance to provide the desired brake slack. The abutment surfaces 30a and 31a on the sleeve member 21a and the end member 22a are conical so that the friction forces arising at these surfaces prevent unintentional rotation of the member 21a. A spring 61 acting on the end member 22a is strong enough to overcome the friction developed at the seal 56 and serves to hold the surfaces 30a and 31a together so long as hydraulic pressure is not applied to the brake.

FIG. 6 shows another modification to the embodiment of FIG. 1 and like or equivalent parts are denoted by like reference numerals. In the adjuster 62 of FIG. 6, a spring 63 replaces the springs 23 and 24 and acts between the second member 21 and the third member 22. The second member 21 is in the form of a sleeve having the non-reversible screw-thread connection 29 with the spindle 28 and a nut 64 fixed to one end of this sleeve. The reversible screw-thread connection 33 (of opposite hand to the screw-thread connection 29) is between the nut 64 and the screw member 32. The third member 22 is in two parts 65 and 66 which are welded to one another of which the part 65 is received in the notch 26 in the shoe 12 and the part 66 has a blind bore 67 housing the parts of the adjuster. The spring 63 is actually disposed between the nut 64 and an internal collar 68 in a bush 69 disposed in the blind bore 67. The bush 69 is non-relatively rotatably fitted in the bore 67, e.g. by a force fit, so that the bush 69 forms a part of the member 22. The spring 35 is a conical spring and acts on the center of the domed head 34 so as not to hinder turning of the screw member 32. The abutment surfaces 30 and 31 are provided respectively on the end of the member 21 and on the bush 69. The conical friction surface 43 is provided inside the bush 69.

A brake return spring (not shown) acts between the brake shoes 11 and 12 and, when the brake is not actuated, applies a thrust to the adjuster, this thrust transmitted through the screw-thread connection 29, the member 21 and the abutment surfaces 30 and 31 overcome the force of the spring 63 and hold the abutment surfaces 30 and 31 in engagement with one another. In the embodiment of FIG. 6 the resting position of the screw member 32 is determined, not by abutment of the screw member 32 with the member 21 but by abutment at the friction surfaces 43 and 44 under the influence of the spring 35.

During operation of the brake the abutment surfaces 30 and 31 are separated by the influence of the spring 63 which is made just strong enough to hold the members 20 and 22 in abutment with the bases of the notches 25 and 26 in the brake shoes 11 and 12 as the shoes move apart. The clearance at the reversible screw-thread connection 33 is made sufficient to accommodate the normal brake slack. However, should the slack be excessive, the travel between the member 21 and 22 during actuation of the brake is sufficient to take up this clearance whereafter, as the nut 64 is pulled along the screw member 32 (which is prevented from rotating by the friction surfaces 43 and 44), the screw-thread connection causes the sleeve 21 to be turned on the spindle 28, thereby reducing the brake slack. On release of the brake the nut 64 as it approaches the bush 69 moves the screw member 32 to the left against the force of the spring 35, thereby separating the friction surfaces 43 and 44 and allowing the member 32 to spin in the nut 64 which is now prevented from turning by the spring 63 acting as a friction member in place of the friction element 45 of FIG. 1.

In FIG. 6, a rolling type diaphragm 41a protects the screw-thread from dirt, etc. and is supported by a shroud 40a attached to the member 22.

I claim:

1. A slack adjuster for a brake system comprising a first non-rotatable member, a second rotatable member and a third non-rotatable member having a common thrust axis; a non-reversible screw-thread connection between said first and second members, said second member being axially displaceable and rotatable relative to said third member and said second and third members having mating abutment surfaces for the transmission of thrust between said first and third members via said abutment surfaces, said second member and said non-reversible screw-thread connection; a fourth member coaxial with said thrust axis; a reversible screw-thread connection between said fourth member and one of said second and third members; axially cooperating friction surfaces between said fourth member and the other of said second and third members, said fourth member being freely rotatable relatively to said other member when said friction surfaces are axially parted, said fourth member having a resting position relative to said one member when said abutment surfaces are in interengagement; and spring means axially biassing said fourth member into said resting position and in a direction to urge said friction surfaces towards one another.

2. A slack adjuster according to claim 1 in which said spring means acts between said other member and said fourth member.

3. A slack adjuster according to claim 1 for a drum brake having opposed brake shoes, which slack adjuster acts as a strut between said opposed brake shoes to limit retraction of the brake shoes.

4. A slack adjuster according to claim 3 having a mechanical actuator which acts between one brake shoe and one end of said strut.

5. A slack adjuster according to claim 3 having a hydraulic actuator which is arranged to act on the brake shoes in the region of the adjuster.

6. A slack adjuster according to claim 2 in which said one member comprises said second member and said other member comprises said third member.

7. A slack adjuster according to claim 1 for a spot type disc brake having a hydraulic actuator with opposed pistons in which said first member is one of said pistons of the hydraulic actuator.

8. A slack adjuster according to claim 7 having a mechanical actuator which acts between the other of said pistons and said third member.

9. A slack adjuster for a brake system comprising a first non-rotatable member, a second rotatable member and a third non-rotatable member having a common thrust axis; a non-reversible screw-thread connection between said first and second members, said second member being axially displaceable and rotatable relative to said third member and said second and third members having mating abutment surfaces for the transmission of thrust between said first and third members via said abutment surfaces, said second member and said non-reversible screw-thread connection; a fourth member coaxial with said thrust axis and having a domed head; a reversible screw-thread connection between said fourth member and one of said second and third members; cooperating friction surfaces between said fourth member and the other of said second and third members, said fourth member being freely rotatable relatively to said other member when said friction surfaces are parted, said fourth member having a resting position relative to said one member when said abutment surfaces are in interengagement; and spring means acting between said other member and the center of said domed head on said fourth member to bias said fourth member into said resting position and in a direction to urge said friction surfaces towards one another.

10. A slack adjuster according to claim 9 in which a cup-shaped element is fitted between said spring means and said domed head, said cup-shaped element having a flat bottom resting against the center of said domed head.

11. A slack adjuster according to claim 9 in which said spring means comprises a conical spring having a narrow end resting directly against the center of said domed head.

12. A slack adjuster according to claim 2 for a brake having a retraction spring, further comprising additional spring means acting between said second and third members in a direction to tend to part said abutment surfaces.

13. A slack adjuster for a brake system comprising a first non-rotatable member, a second rotatable member and a third non-rotatable member having a common thrust axis; a non-reversible screw-thread connection between said first and second members, said second member being axially displaceable and rotatable relative to said third member and said second and third members having mating abutment surfaces for the transmission of thrust between said first and third members via said abutment surfaces, said second member and said non-reversible screw-thread connection; a fourth screw member coaxial with said thrust axis and having a domed head; a reversible screw-thread connection between said fourth screw member and one of said second and third members, the external thread being on said fourth screw member; cooperating friction surfaces between said fourth screw member and the other of said second and third members, said fourth screw member being freely rotatable relative to said other member when said friction surfaces are parted; and means engaging the center of said domed head with low frictional resistance to rotation of said fourth screw member to hold said fourth screw member in a resting position with respect to said one member when said abutment surfaces are in engagement with one another.

14. A slack adjuster according to claim 13 in which said element comprises stop means on said other member.

15. A slack adjuster according to claim 14 further comprising a biassing spring acting on said one member in a direction to urge said abutment surface thereon against said abutment surface on said other member, an axial clearance at said non-reversible screw-thread connection providing a desired brake slack.

16. A slack adjuster according to claim 13 in which said one member comprises said third member and said other member comprises said second member.

* * * * *